US012572398B2

(12) United States Patent
Molchanov et al.

(10) Patent No.: US 12,572,398 B2
(45) Date of Patent: Mar. 10, 2026

(54) CONSOLE COMMAND COMPOSITION

(71) Applicant: EMC IP Holding Company LLC, Hopkinton, MA (US)

(72) Inventors: Dmitry Molchanov, Saint Petersburg (RU); Alexey Sedlyarsky, Saint Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 966 days.

(21) Appl. No.: 17/718,620

(22) Filed: Apr. 12, 2022

(65) Prior Publication Data

US 2023/0116173 A1 Apr. 13, 2023

(30) Foreign Application Priority Data

Oct. 11, 2021 (RU) ............................ RU2021129512

(51) Int. Cl.
*G06F 9/54* (2006.01)
(52) U.S. Cl.
CPC ................................... *G06F 9/544* (2013.01)
(58) Field of Classification Search
CPC ............................. G06F 9/544; G06F 9/45512
See application file for complete search history.

(56) References Cited

U.S. PATENT DOCUMENTS

| | | | |
|---|---|---|---|
| 10,318,491 | B1 | 6/2019 | Graham et al. |
| 10,498,814 | B2 | 12/2019 | Cao |
| 10,581,888 | B1 | 3/2020 | Agranonik et al. |
| 11,151,049 | B2 | 10/2021 | Meiri et al. |
| 11,163,708 | B2 | 11/2021 | Lecrone et al. |
| 2010/0318543 | A1* | 12/2010 | Chaudhuri ............ G06F 16/217 707/769 |
| 2015/0052596 | A1* | 2/2015 | Ayanam .................. H04W 4/38 726/8 |
| 2017/0091235 | A1* | 3/2017 | Yammine .............. G06F 16/164 |
| 2020/0379788 | A1* | 12/2020 | Bregman .................. G06F 8/60 |

* cited by examiner

*Primary Examiner* — Kevin L Young
*Assistant Examiner* — Carina Yun
(74) *Attorney, Agent, or Firm* — BainwoodHuang

(57) ABSTRACT

Techniques for facilitating the composition of console commands for storage systems and appliances. The techniques include receiving a command prefix at a management console and accessing a plurality of first parameter designations associated with the command prefix from a first hierarchical level of a command tree. The techniques include receiving a selection of a first parameter designation from among the first parameter designations and accessing a plurality of second parameter designations associated with the first parameter designation from a second hierarchical level of the command tree. The techniques include receiving a selection of a second parameter designation from among the second parameter designations and merging the command prefix, the first parameter designation, and the second parameter designation to form a console command for performing a specified task or operation. The techniques include performing the specified task or operation by executing the console command, which may have its own parameters.

17 Claims, 6 Drawing Sheets

200c

200d

300c ⟶

303
304

204

300d ⟶

303

310

308

CONSOLE COMMAND COMPOSITION

BACKGROUND

Storage systems include one, two, or more storage appliances communicably coupled to arrays (also referred to herein as a "storage arrays") of storage units or devices such as magnetic disk drives, electronic flash drives, and/or optical drives. The storage appliances are configured to service storage input/output (IO) requests issued by storage client computers (also referred to herein as "storage clients") that specify data elements such as data blocks, data pages, and/or data files to be created on, read from, written to, or deleted from storage objects such as volumes (VOLs), logical units (LUs), and/or filesystems on the storage arrays. System administrators control and/or communicate with the storage appliances via management consoles, which include command line interfaces (CLIs) and/or graphical user interfaces (GUIs) through which the system administrators can provide input to the storage appliances and view output from the storage appliances.

SUMMARY

Management consoles for storage appliances can use command shells to facilitate input of commands pertaining to administrative tasks and/or storage operations. One such command shell is available under the name PowerShell™ from Microsoft Corporation, Redmond, Washington, USA. In the context of storage appliances, the PowerShell™ command shell allows system administrators to compose or generate specialized commands called "cmdlets," which can be used to control and/or communicate with the storage appliances to provision storage objects, configure consistency groups, manage data protection schemes, and so on.

Unfortunately, there are drawbacks to using command shells such as the PowerShell™ command shell to compose or generate specialized commands for storage appliances. For example, system administrators can require up to one hundred (100) or more such specialized commands for certain administrative tasks and/or storage operations, each of which can have a relatively complex command name such as, for example, "Get-XmsystemConsistencyGroup Volumes," "Get-XmsystemRemoteProtectionConsistencyGroups," "Start-XmsystemRemote ProtectionSession-Failover," and so on. Further, such complex command names can be hard for system administrators to remember without consulting help files and difficult to accurately input on management consoles, which can be detrimental to the quality of user experience while performing administrative and/or storage activities.

Techniques are disclosed herein for facilitating the composition of console commands for storage systems and appliances. The disclosed techniques can be used with command shells such as the PowerShell™ command shell to create or compose specialized commands or aliases pertaining to administrative tasks and/or storage operations, without requiring users to remember and/or input complex command names on management consoles. In the disclosed techniques, each specialized command or alias has a format that includes a relatively concise command prefix followed by one or more command parameters. In the context of the PowerShell™ command shell, the command prefix can correspond to a command name, and the one or more command parameters can correspond to parameter values of the command name. In the disclosed techniques, each command prefix and parameter can correspond to a hierarchical level of a command tree. The command prefix (e.g., xms) can correspond to an upper hierarchical level of the command tree, a first command parameter can correspond to an intermediate hierarchical level of the command tree, and a second command parameter can correspond to a lower hierarchical level of the command tree. In the disclosed techniques, the first command parameter can correspond to a desired entity designation (e.g., Volume) and the second command parameter can correspond to a desired action designation (e.g., Get). The user can enter the command prefix (e.g., xms) and the first and second command parameters (e.g., Volume, Get) on a command line interface (CLI) of a management computer.

Once the concise command prefix (e.g., xms) has been entered on the management console, a plurality of entity designations associated with the command prefix can be accessed from the intermediate hierarchical level of the command tree and displayed on a user interface (UI) display of the management computer to facilitate user selection of the desired entity designation (e.g., Volume). Once the desired entity designation has been selected, a plurality of action designations associated with the desired entity designation can be accessed from the lower hierarchical level of the command tree and displayed on the UI display to facilitate user selection of the desired action designation (e.g., Get). Once the desired action designation has been selected, the command prefix, the desired entity designation, and the desired action designation can be merged (e.g., xmsVolumeGet) on the CLI of the management computer to form a simplified console command or alias for a more complex command name, which is recognizable by a command shell (e.g., PowerShell™) implemented on the management console. The user can then execute the simplified console command or alias with its own parameters (e.g., parameter name, parameter value) to perform a specified administrative task or storage operation. In this way, the quality of user experience while performing administrative tasks and/or storage operations on management consoles can be improved.

In certain embodiments, a method of facilitating the composition of console commands includes receiving a command prefix at a console of a computer and accessing a plurality of first parameter designations associated with the command prefix from a first hierarchical level of a command tree. The method further includes receiving a selection of a first parameter designation from among the plurality of first parameter designations and accessing a plurality of second parameter designations associated with the first parameter designation from a second hierarchical level of the command tree. The method further includes receiving a selection of a second parameter designation from among the plurality of second parameter designations and merging the command prefix, the first parameter designation, and the second parameter designation to form a console command for performing a specified task or operation.

In certain arrangements, the console command may have its own parameters, if required. The method further includes executing the console command to perform the specified task or operation.

In certain arrangements, the method further includes, having received the command prefix at the console of the computer, entering the command prefix on a command line of a command line interface (CLI) of the computer.

In certain arrangements, the method further includes, having received the selection of the first parameter designation from among the plurality of first parameter designations, causing the first parameter designation to automatically appear on the command line adjacent and following the command prefix, the command prefix and the first parameter designation being separated on the command line by a first space character.

In certain arrangements, the method further includes, having received the selection of the second parameter designation from among the plurality of second parameter designations, causing the second parameter designation to automatically appear on the command line adjacent and following the first parameter designation, the first parameter designation and the second parameter designation being separated on the command line by a second space character.

In certain arrangements, the method further includes forming the console command on a next input line below the command line of the CLI.

In certain arrangements, the method further includes forming the console command on the same input line as the command line of the CLI.

In certain arrangements, the method further includes forming the console command on a next input line below the command line of the CLI or the same input line as the command line of the CLI with the first space character separating the command prefix and the first parameter designation being removed and the second space character separating the first parameter designation and the second parameter designation being removed.

In certain arrangements, the command prefix corresponds to a second console command configured to accept the first parameter designation and the second parameter designation as a first command parameter and a second command parameter, respectively. The method further includes executing the second console command with the first command parameter to navigate the command tree to select the first parameter designation and executing the second console command with the second command parameter to navigate the command tree to select the second parameter designation.

In certain embodiments, a system for facilitating the composition of console commands includes a memory and processing circuitry configured to execute program instructions out of the memory to receive a command prefix at a console of a computer, access a plurality of first parameter designations associated with the command prefix from a first hierarchical level of a command tree, receive a selection of a first parameter designation from among the plurality of first parameter designations, access a plurality of second parameter designations associated with the first parameter designation from a second hierarchical level of the command tree, receive a selection of a second parameter designation from among the plurality of second parameter designations, and merge the command prefix, the first parameter designation, and the second parameter designation to form a console command for performing a specified task or operation.

In certain embodiments, a computer program product includes a set of non-transitory, computer-readable media having instructions that, when executed by processing circuitry, cause the processing circuitry to perform a method including receiving a command prefix at a console of a computer and accessing a plurality of first parameter designations associated with the command prefix from a first hierarchical level of a command tree. The method further includes receiving a selection of a first parameter designation from among the plurality of first parameter designations and accessing a plurality of second parameter designations associated with the first parameter designation from a second hierarchical level of the command tree. The method further includes receiving a selection of a second parameter designation from among the plurality of second parameter designations and merging the command prefix, the first parameter designation, and the second parameter designation to form a console command for performing a specified task or operation.

Other features, functions, and aspects of the present disclosure will be evident from the Detailed Description that follows.

BRIEF DESCRIPTION OF THE DRAWINGS

The foregoing and other objects, features, and advantages will be apparent from the following description of embodiments of the present disclosure, as illustrated in the accompanying drawings, in which like reference characters refer to the same parts throughout the different views.

FIG. 2c is a screen shot of an exemplary user interface (UI) display of a management computer illustrating the command prefix of FIG. 2a entered on a command line interface (CLI), the selected entity designation of FIG. 2b displayed on the CLI, and the plurality of entity designations of FIG. 2a;

FIG. 3c is a screen shot of the UI display of the management computer illustrating the command prefix of FIG. 3a entered on the CLI, the selected entity designation of FIG. 3b displayed on the CLI, and the plurality of entity designations of FIG. 3a;

FIG. 3d is another screen shot of the UI display of the management computer illustrating the command prefix of FIG. 3a entered on the CLI, the selected entity designation of FIG. 3*b* displayed on the CLI, the selected action designation of FIG. 3*b* displayed on the CLI, and the plurality of action designations of FIG. 3*b*.

DETAILED DESCRIPTION

Techniques are disclosed herein for facilitating the composition of console commands for storage systems and appliances. The disclosed techniques can include receiving a command prefix at a management console and accessing a plurality of first parameter designations associated with the command prefix from a first hierarchical level of a command tree. The disclosed techniques can further include receiving a selection of a first parameter designation from among the plurality of first parameter designations and accessing a plurality of second parameter designations associated with the first parameter designation from a second hierarchical level of the command tree. The disclosed techniques can further include receiving a selection of a second parameter designation from among the plurality of second parameter designations and merging the command prefix, the first parameter designation, and the second parameter designation to form a console command for performing a specified task or operation. The disclosed techniques can further include executing the console command with at least one parameter to perform the specified task or operation. In this way, the quality of user experience while performing administrative tasks and/or storage operations on management consoles can be improved.

Figure 1:
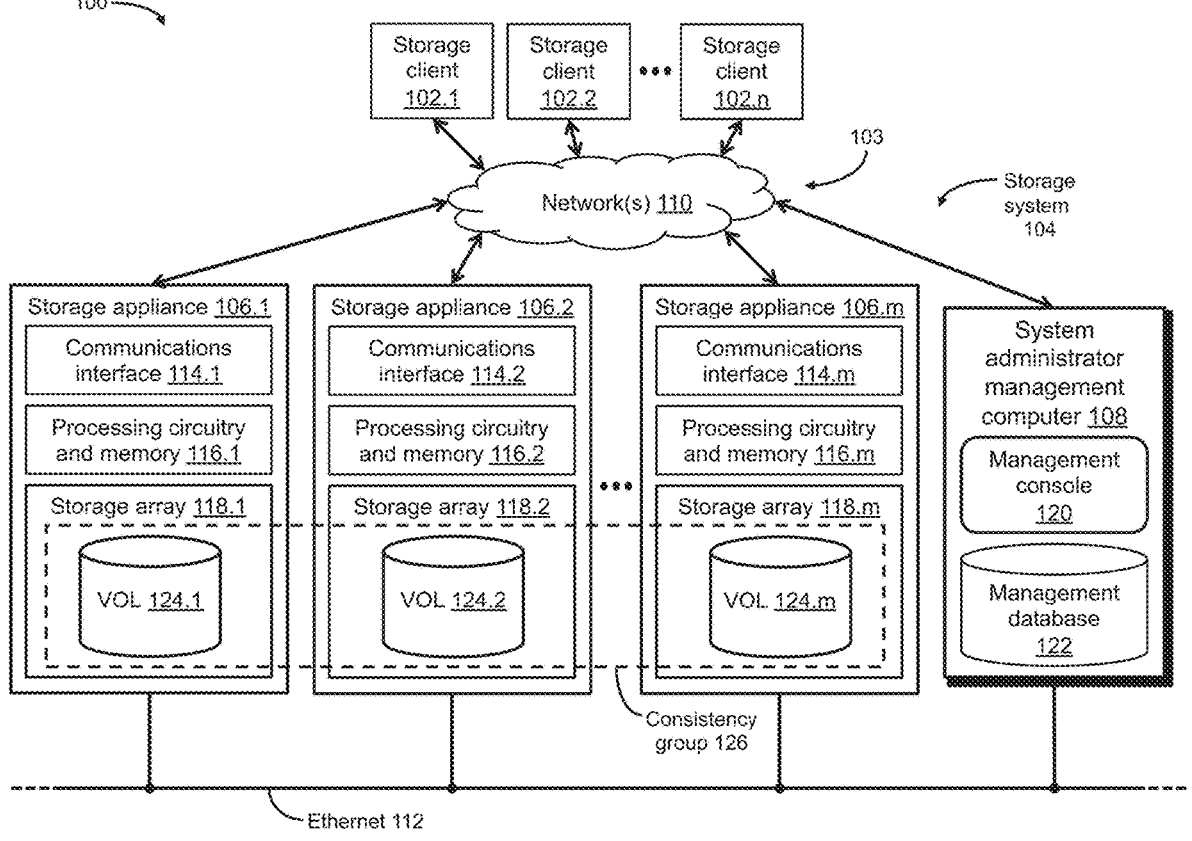
FIG. 1 is a block diagram of an exemplary storage environment, in which techniques can be practiced for facilitating the composition of console commands for storage systems and appliances.

FIG. 1 depicts an illustrative embodiment of an exemplary storage environment 100, in which techniques can be practiced for facilitating the composition of console commands for storage systems and appliances. As shown in FIG. 1, the storage environment 100 can include a plurality of storage client computers ("storage clients") 102.1, 102.2, . . . , 102.*n* communicably coupled to a storage system 104 by a communications medium 103 that includes at least one network 110. For example, each of the plurality of storage clients 102.1, . . . , 102.*n* can be a web server computer, a file server computer, an email server computer, an enterprise server computer, and/or any other suitable computer or computerized device. The storage clients 102.1, . . . , 102.*n* can be configured to provide, over the network(s) 110, storage input/output (IO) requests (e.g., small computer system interface (SCSI) commands, network file system (NFS) commands) to the storage system 104. Such storage IO requests (e.g., read requests, write requests) can direct the storage system 104 to read and/or write data blocks, data pages, and/or data files, and/or any other suitable data elements from/to volumes (VOLs), logical units (LUs), filesystems, and/or any other suitable storage objects on one or more of a plurality of storage arrays 118.1, 118.2, . . . , 118.*m*. The storage system 104 can include one, two, or more storage appliances 106.1, 106.2, . . . , 106.*m*. As such, the storage system 104 can be configured as either a standalone storage system including, for example, the storage appliance 106.1 or a clustered storage system ("storage cluster") including, for example, two or more of the storage appliances 106.1, . . . , 106.*m*.

The communications medium 103 can be configured to interconnect the storage clients 102.1, . . . , 102.*n* with one, two, or more of the storage appliances 106.1, . . . , 106.*m* to enable them to communicate and exchange data and control signaling. As shown in FIG. 1, the communications medium 103 can be illustrated as a "cloud" to represent different network topologies such as a storage area network (SAN) topology, a network attached storage (NAS) topology, a local area network (LAN) topology, a metropolitan area network (MAN) topology, a wide area network (WAN) topology, and so on. As such, the communications medium 103 can include copper-based data communications devices and cabling, fiber optic devices and cabling, wireless devices, and so on, or any suitable combination thereof.

The storage appliances 106.1, 106.2, . . . , 106.*m* can include communications interfaces 114.1, 114.2, . . . , 114.*m*, respectively, processing circuitry and memory components 116.1, 116.2, . . . , 116.*m*, respectively, as well as the storage arrays 118.1, 118.2, . . . , 118.*m*, respectively. Each of the communications interfaces 114.1, . . . , 114.*m* can include an Ethernet interface, an InfiniBand interface, a Fiber Channel interface, and/or any other suitable communications interface. The communications interfaces 114.1, . . . , 114.*m* can further include SCSI target adapters, network interface adapters, and/or any other suitable adapters for converting electronic, optical, and/or wireless signals received over the network(s) 110 to a form suitable for use by the processing circuitry and memory components 116.1, . . . , 116.*m*. The processing circuitry/memory components 116.1, . . . , 116.*m* can be configured to process storage 10 requests (e.g., read requests, write requests) from the respective storage clients 102.1, . . . , 102.*n* and store client data in a redundant array of independent disk (RAID) environment implemented by the storage arrays 118.1, . . . , 118.*m*. Each of the processing circuitry/memory components 116.1, . . . , 116.*m* can include persistent memory (e.g., flash memory, magnetic memory) and non-persistent cache memory (e.g., dynamic random-access memory (DRAM), static random-access memory (SRAM)), and accommodate a variety of software constructs including operating system (OS) code and data, storage system code and data, and so on. The storage arrays 118.1, 118.2, . . . , 118.*m* can be configured to store volumes (VOLs) 124.1, 124.2, . . . , 124.*m*, respectively, and/or any other suitable storage objects. The storage appliances 106.1, . . . , 106.*m* can be coupled to an Ethernet sub-network 112 and/or any other suitable network or sub-network.

As shown in FIG. 1, the storage system 104 can further include a system administrator management computer (also referred to herein as the "management computer") 108, which can be coupled to the network(s) 110 and the Ethernet sub-network 112. The management computer 108 can include a management console 120, a management database 122, as well as one or more input devices (e.g., keyboard, mouse) and user interface (UI) displays. The system administrator (also referred to herein as the "user") can, through the management console 120, orchestrate the network configuration of the storage system 104, orchestrate which storage appliances 106.1, . . . , 106.*n* are connected to which storage arrays 118.1, . . . , 118.*n*, orchestrate where the VOLs 124.1, . . . , 124.*m* are located with respect to the storage arrays 118.1, . . . , 118.*n*, as well as orchestrate the creation of one or more consistency groups (such as a distributed consistency group 126; see FIG. 1) for the VOLs 124.1, . . . , 124.*m*. As employed herein, the term "consistency group" refers to a set of volumes of an application stored on at least one storage appliance, and the term "distributed consistency group" refers to a set of volumes of an application where the respective volumes are stored and distributed across a cluster of storage appliances. The management database 122 can be configured to store information pertaining to the network configuration of the storage system 104, the locations of the VOLs 124.1, . . . , 124.*n* within the consistency group 126, and so on. As shown in FIG. 1, the consistency group 126 can include the set of VOLs 124.1, . . . , 124.n stored and distributed across the cluster of storage appliances 106.1, . . . , 106.n.

During operation, the disclosed techniques can be used to facilitate the composition of console commands for storage systems and appliances. The disclosed techniques can be used with command shells such as the PowerShell™ command shell (or any other suitable command shell) to create or compose specialized commands or aliases pertaining to administrative tasks and/or storage operations, without requiring users to remember and/or input complex command names on the management console 120. In the disclosed techniques, each specialized command or alias has a format that includes a relatively concise command prefix followed by one or more command parameters. In the context of the PowerShell™ command shell, the command prefix can correspond to a command name, and the one or more command parameters can correspond to parameter values of the command name. In the disclosed techniques, each command prefix and parameter can correspond to a hierarchical level of a command tree. The command prefix (e.g., xms) can correspond to an upper hierarchical level of the command tree, a first command parameter can correspond to an intermediate hierarchical level of the command tree, and a second command parameter can correspond to a lower hierarchical level of the command tree. In the disclosed techniques, the first command parameter can correspond to a desired entity designation (e.g., Volume) and the second command parameter can correspond to a desired action designation (e.g., Get). The user can enter the command prefix (e.g., xms), the first command parameter (e.g., Volume), and the second command parameter (e.g., Get) on a command line interface (CLI) of the management computer 108.

Once the concise command prefix (e.g., xms) has been entered on the management console 120, a plurality of entity designations associated with the command prefix can be accessed from the intermediate hierarchical level of the command tree and displayed on a UI display of the management computer 108 to facilitate user selection of the desired entity designation (e.g., Volume). Once the desired entity designation has been selected, a plurality of action designations associated with the desired entity designation can be accessed from the lower hierarchical level of the command tree and displayed on the UI display to facilitate user selection of the desired action designation (e.g., Get). Once the desired action designation has been selected, the command prefix, the desired entity designation, and the desired action designation can be merged (e.g., xmsVolumeGet) on the CLI of the management computer 108 to form a simplified console command or alias for a more complex command name, which is recognizable by the command shell (e.g., PowerShell™) implemented on the management console 120. The user can then execute the simplified console command or alias with its own parameters (e.g., parameter name, parameter value) to perform a specified administrative task or storage operation. In this way, the quality of user experience while performing administrative tasks and/or storage operations on management consoles can be improved.

The disclosed techniques for facilitating the composition of console commands for storage systems and appliances will be further understood with reference to the following illustrative example and FIGS. 1, 2a-2d, and 3a-3d. In this example, it is assumed that a command shell such as the PowerShell™ command shell (or any other suitable command shell) has been implemented on the management console 120 of the management computer 108. Further in this example, the user creates or composes a plurality of console commands or aliases, which are recognizable by the command shell. In one embodiment, a specialized console command can be created or composed to conform to the requirements of the PowerShell™ command shell (or any other suitable command shell). Alternatively, or in addition, a console command can correspond to a command equivalent to a predefined cmdlet or command. As employed herein, the term "alias" refers to an alternate name for a cmdlet or command. For example, such an alias can be created using the PowerShell™ cmdlet "Set-Alias" (or any other suitable cmdlet or command).

Figures 2A, 2B:
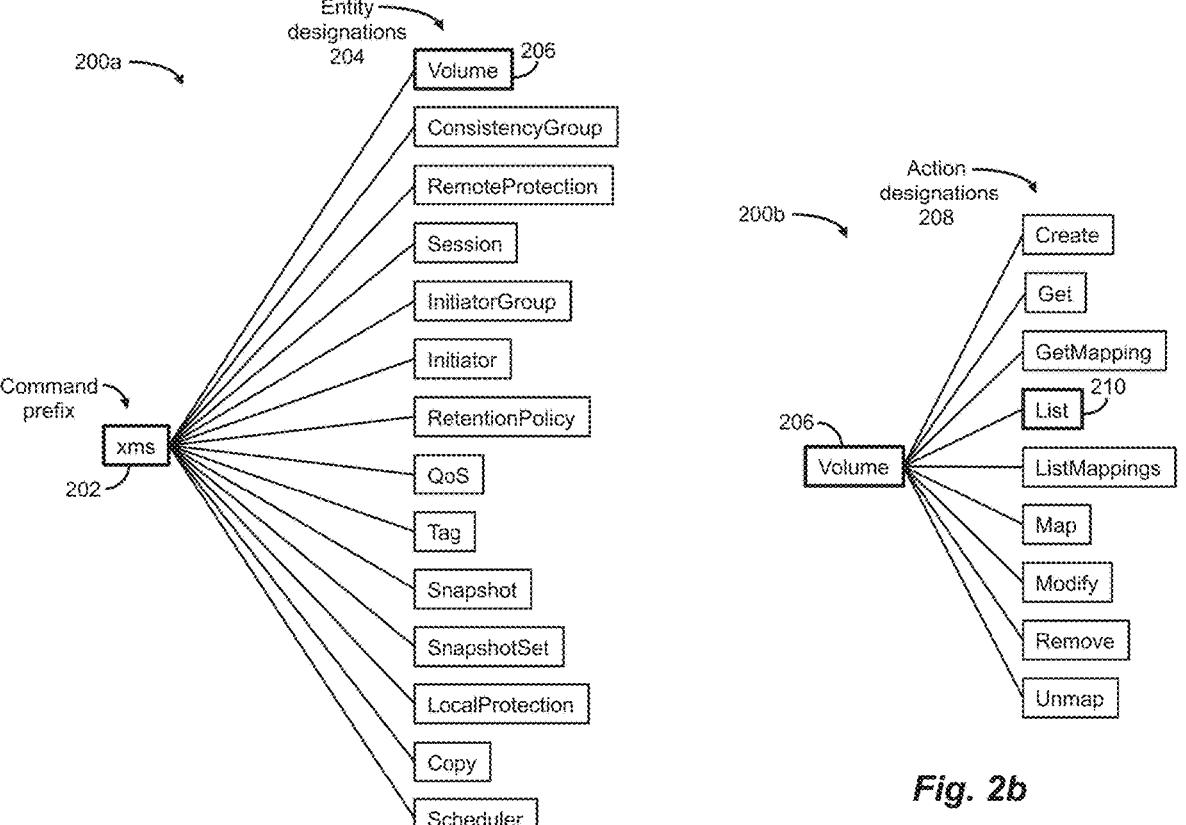
FIG. 2a is a diagram of a portion of an exemplary command tree including a command prefix in an upper hierarchical level of the command tree, a plurality of entity designations in an intermediate hierarchical level of the command tree, and a selected entity designation from among the plurality of entity designations in the intermediate hierarchical level of the command tree.
FIG. 2b is a diagram of another portion of the command tree including the selected entity designation of FIG. 2a, a plurality of action designations in a lower hierarchical level of the command tree, and a selected action designation from among the plurality of action designations in the lower hierarchical level of the command tree.

As described herein, each console command or alias can be composed using a format that includes a relatively concise command prefix followed by one or more command parameters, in which each command prefix and parameter corresponds to a hierarchical level of a command tree. FIGS. 2a and 2b depict a first portion 200a and a second portion 200b, respectively, of an exemplary command tree used to compose a first console command (or alias) "xmsVolumeList," which has a format that includes a relatively concise command prefix "xms" (reference numeral 202; see FIG. 2a), a first command parameter "Volume" (reference numeral 206; see FIGS. 2a and 2b), and a second command parameter "List" (reference numeral 210; see FIG. 2b). In this example, the first command parameter corresponds to an entity designation (e.g., Volume) and the second command parameter corresponds to an action designation (e.g., List). As shown in FIG. 2a, the first portion 200a of the command tree includes the command prefix xms 202 at an upper hierarchical level of the command tree, and a plurality of entity designations 204 associated with the command prefix xms 202 at an intermediate hierarchical level of the command tree. The plurality of entity designations 204 can include the entity designation Volume 206, as well as entity designations "ConsistencyGroup," "RemoteProtection," "Session," "InitiatorGroup," "Initiator," "RetentionPolicy," "QoS," "Tag," "Snapshot," "SnapshotSet," "LocalProtection," "Copy," "Scheduler," and/or any other suitable entity designation. As shown in FIG. 2b, the second portion 200b of the command tree includes the entity designation Volume 206 at the intermediate hierarchical level of the command tree, and a plurality of action designations 208 associated with the entity designation Volume 206 at a lower hierarchical level of the command tree. The plurality of action designations 208 can include the action designation List 210, as well as action designations "Create," "Get," "GetMapping," "ListMappings," "Map," "Modify," "Remove," "Unmap," and/or any other suitable action designation. It is noted that each of the entity designations 204 at the intermediate hierarchical level of the command tree can have a plurality of action designations associated therewith at the lower hierarchical level of the command tree.

Figure 2C:
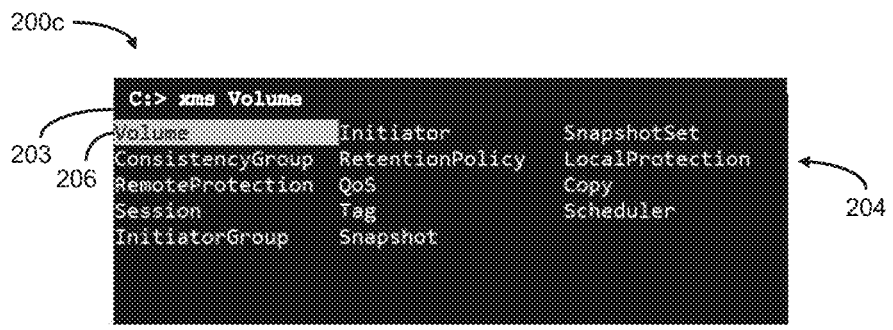
Figure 2D:
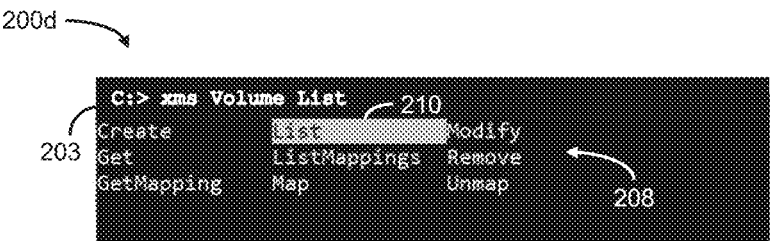
FIG. 2d is another screen shot of the UI display of the management computer illustrating the command prefix of FIG. 2a entered on the CLI, the selected entity designation of FIG. 2b displayed on the CLI, the selected action designation of FIG. 2b displayed on the CLI, and the plurality of action designations of FIG. 2b.

FIGS. 2c and 2d depict a first screen shot 200c and a second screen shot 200d, respectively, of the UI display of the management computer 108. As shown in FIG. 2c, the concise command prefix "xms" has been entered by the user on a command line 203 of a command line interface (CLI) of the management computer 108. Once the command prefix "xms" has been entered on the command line 203, the user can actuate one or more shortcut keys (e.g., Ctrl+Space) on the keyboard to cause the management console 120 to access the plurality of entity designations 204 associated with the command prefix xms 202 from the intermediate hierarchical level of the command tree. In one embodiment, "xms" can correspond to a console command (or alias) for an exemplary cmdlet "Get-XMScommand," which can be used to get or otherwise access the plurality of entity designations 204. For example, the plurality of entity designations 204 can be contained on the management computer 108 in a static list variable, which is a variable that has a specific list of possible multiple-choice values that remain the same for each user of the computer. Having accessed the plurality of entity designations 204 associated with the command prefix xms 202, the management console 120 displays the plurality of entity designations 204 on the UI display. As further shown in FIG. 2c, the entity designation Volume 206 (or any other desired entity designation) has been selected by the user on the UI display using the keyboard or mouse of the management computer 108, causing the selected entity designation "Volume" to be highlighted on the UI display and automatically appear on the command line 203 adjacent and following the command prefix "xms." Once the entity designation Volume 206 has been selected, the management console 120 removes the plurality of entity designations 204 from the UI display. Further, the user can again actuate one or more shortcut keys (e.g., Ctrl+Space) on the keyboard to cause the management console 120 to access the plurality of action designations 208 associated with the entity designation Volume 206 from the lower hierarchical level of the command tree. Like the plurality of entity designations 204, the plurality of action designations 208 can be contained on the management computer 108 in a static list variable. Having accessed the plurality of action designations 208 associated with the entity designation Volume 206, the management console 120 displays the plurality of action designations 208 on the UI display. As shown in FIG. 2d, the action designation List 210 (or any other desired action designation) has been selected by the user on the UI display using the keyboard or mouse of the management computer 108, causing the selected action designation "List" to be highlighted on the UI display and automatically appear on the command line 203 adjacent and following the entity designation "Volume."

Once the action designation List 210 has been selected, the management console 120 removes the plurality of action designations 208 from the UI display. Further, the management console 120 merges the command prefix "xms," the entity designation "Volume," and the action designation "List" to form the console command "xmsVolumeList" on the next input line below the command line 203, as follows:

$$C:>xmsVolumeList. \qquad (1)$$

For example, to merge the command prefix "xms," the entity designation "Volume," and the action designation "List" and form the merged console command "xmsVolumeList" on the next input line, the Microsoft™ Component Object Model (COM) can be used in conjunction with the PowerShell™ command shell to send the appropriate keystrokes, as follows:

$$\$wshell=New-Object-ComObject\ wscript.shell;\$wshell.SendKeys('\$theCommand'), \qquad (2)$$

in which "$theCommand" corresponds to a variable containing the string "xmsVolumeList." Alternatively, using the PowerShell™ PSReadLine module, the merged console command "xmsVolumeList" can be formed on the same input line as the command line 203. To that end, the code for the "space" character can be registered with the PSReadLine key handler (PSReadLineKeyHandler), and, using the PSReadLine key handler, the command prefix "xms," the entity designation "Volume," and the action designation "List" can be merged by deleting a first space character between the command prefix "xms" and the entity designation "Volume" and deleting a second space character between the entity designation "Volume" and the action designation "List."

Once the command prefix "xms," the entity designation "Volume," and the action designation "List" are merged to form the console command "xmsVolumeList," the user can execute the console command "xmsVolumeList" with its own parameter or parameters to perform a specified task or operation on the management console 120. In this example, the user executes the console command "xmsVolumeList" with the parameter "-Property name" (or any other suitable parameter), as follows:

$$C:>xmsVolumeList-Property\ name. \qquad (3)$$

Once the console command "xmsVolumeList" has been executed with the parameter "-Property name," the management computer 108 displays, on the UI display, an exemplary list of volume names for the respective VOLs 124.1, 124.2, . . . , 124.m (see FIG. 1), as follows:

Vol1_200503_1907

Vol2_200503_1907

$$Volm\_200503\_1907. \qquad (4)$$

Figures 3A, 3B:
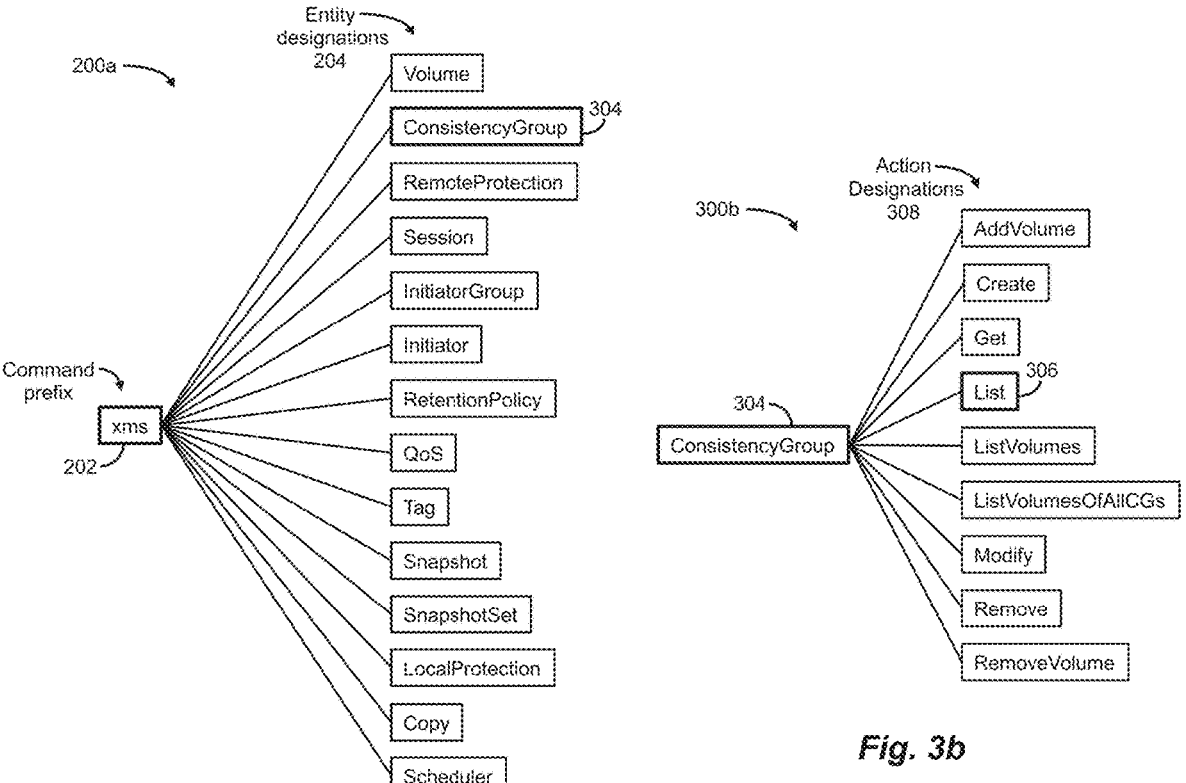
FIG. 3a is a diagram of the portion of the command tree of FIG. 2a including the command prefix of FIG. 2a in the upper hierarchical level of the command tree, the plurality of entity designations of FIG. 2a in the intermediate hierarchical level of the command tree, and another selected entity designation from among the plurality of entity designations in the intermediate hierarchical level of the command tree.
FIG. 3b is a diagram of another portion of the command tree including the selected entity designation of FIG. 3a, another plurality of action designations in the lower hierarchical level of the command tree, and a selected action designation from among the plurality of action designations in the lower hierarchical level of the command tree.

FIGS. 3a and 3b depict the first portion 200a (see also FIG. 2a) and a third portion 300b, respectively, of the command tree, which is further used to compose a second console command (or alias) "xmsConsistencyGroupList," which has a format that includes the concise command prefix "xms" (reference numeral 202; see FIG. 3a), a first command parameter "ConsistencyGroup" (reference numeral 304; see FIGS. 3a and 3b), and a second command parameter "List" (reference numeral 306; see FIG. 3b). In this example, the first command parameter ConsistencyGroup 304 corresponds to an entity designation, and the second command parameter List 306 corresponds to an action designation. As shown in FIG. 3a, the command tree includes the command prefix xms 202 at the upper hierarchical level of the command tree, and the plurality of entity designations 204 associated with the command prefix xms 202 at the intermediate hierarchical level of the command tree. As shown in FIG. 3b, the third portion 300b of the command tree includes the entity designation ConsistencyGroup 304 at the intermediate hierarchical level of the command tree, and a plurality of action designations 308 associated with the entity designation ConsistencyGroup 304 at the lower hierarchical level of the command tree. The plurality of action designations 308 includes the action designation List 306, as well as action designations "AddVolume," "Create," "Get," "ListVolumes," "Li stVolumesOfAllCGs," "Modify," "Remove," "RemoveVolume," and/or any other suitable action designation.

Figures 3C, 3D:

FIGS. 3c and 3d depict a third screen shot 300c and a fourth screen shot 300d, respectively, of the UI display of the management computer 108. As shown in FIG. 3c, the concise command prefix "xms" can be entered by the user on a command line 303 of the CLI of the management computer 108. Once the command prefix "xms" has been entered on the command line 303, the user can actuate one or more shortcut keys (e.g., Ctrl+Space) on the keyboard to cause the management console 120 to access the plurality of entity designations 204 associated with the command prefix "xms" from the intermediate hierarchical level of the command tree. As described herein, in one embodiment, "xms" can correspond to a console command (or alias) for the cmdlet "Get-XMScommand," which can again be used to get or otherwise access the plurality of entity designations 204. Having accessed the plurality of entity designations 204 associated with the command prefix xms 202, the management console 120 displays the plurality of entity designations 204 on the UI display of the management computer 108. As shown in FIG. 3*c*, the entity designation ConsistencyGroup 304 (or any other desired entity designation) has been selected by the user on the UI display using the keyboard or mouse of the management computer 108, causing the entity designation "ConsistencyGroup" to be highlighted on the UI display and automatically appear on the command line 303 adjacent and following the command prefix "xms." Once the entity designation ConsistencyGroup 304 has been selected, the management console 120 accesses the plurality of action designations 308 associated with the entity designation ConsistencyGroup 304 from the lower hierarchical level of the command tree. Like the plurality of action designations 208, the plurality of action designations 308 can be contained on the management computer 108 in a static list variable. Having accessed the plurality of action designations 308 associated with the entity designation ConsistencyGroup 304, the management console 120 displays the plurality of action designations 308 on the UI display. As shown in FIG. 3*d*, the action designation List 310 (or any other desired action designation) has been selected by the user on the UI display using the keyboard or mouse of the management computer 108, causing the selected action designation List 310 to be highlighted on the UI display and automatically appear on the command line 303 adjacent and following the entity designation "ConsistencyGroup."

Once the action designation "List" has been selected, the management console 120 removes the plurality of action designations 308 from the UI display. Further, using the Microsoft™ COM in conjunction with the PowerShell™ command shell, the management console 120 merges the command prefix "xms," the entity designation "ConsistencyGroup," and the action designation "List" to form the console command "xmsConsistencyGroupList" on the next input line below the command line 303, as follows:

$$C:>xmsConsistencyGroupList. \qquad (5)$$

Alternatively, the console command "xmsConsistencyGroupList" can be formed on the same input line as the command line 303 using the PowerShell™ PSReadLine module.

Once the command prefix "xms," the entity designation "ConsistencyGroup," and the action designation "List" are merged to form the console command "xmsConsistencyGroupList," the user can execute the console command "xmsConsistencyGroupList" with its own parameter or parameters to perform another specified task or operation on the management console 120. In this example, the user executes the console command "xmsConsistencyGroupList" with the parameter "-Property name" (or any other suitable additional parameter), as follows:

$$C:>xmsConsistencyGroupList-Property name. \qquad (6)$$

Once the console command "xmsConsistencyGroupList" has been executed with the parameter "-Property name," the management computer 108 displays, on the UI display, an exemplary list of names of consistency groups for the storage system 104. Because the single consistency group 126 has been created for the storage system 104, the management computer 108 displays a list that includes an exemplary consistency group name for the single consistency group 126, as follows:

$$CG1. \qquad (7)$$

Figure 4:
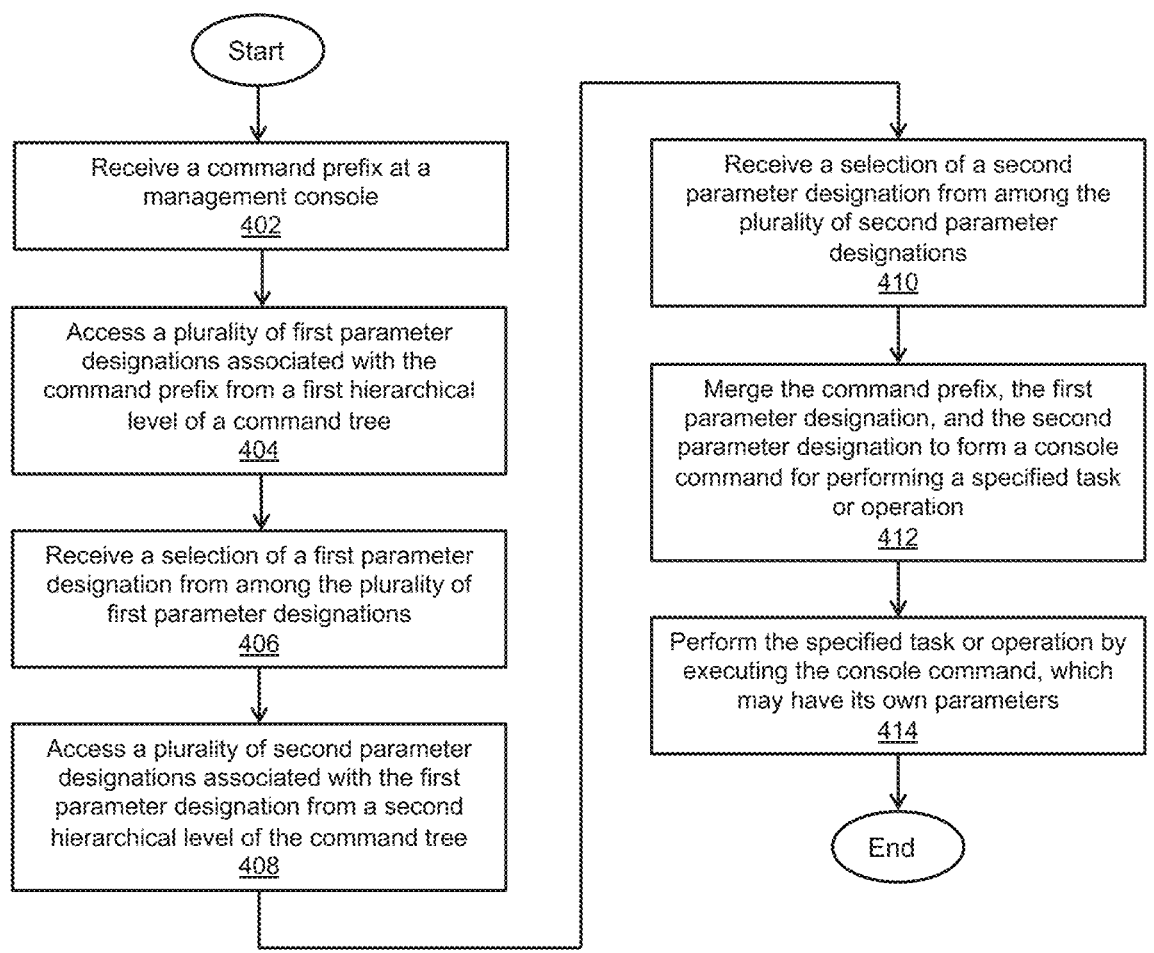
FIG. 4 is a flow diagram of an exemplary method of facilitating the composition of console commands for storage systems and appliances.

An exemplary method of facilitating the composition of console commands for storage systems and appliances is described below with reference to FIG. 4. As depicted in block 402, a command prefix is received at a management console. As depicted in block 404, a plurality of first parameter designations associated with the command prefix are accessed from a first hierarchical level of a command tree. As depicted in block 406, a selection of a first parameter designation is received from among the plurality of first parameter designations. As depicted in block 408, a plurality of second parameter designations associated with the first parameter designation are accessed from a second hierarchical level of the command tree. As depicted in block 410, a selection of a second parameter designation is received from among the plurality of second parameter designations. As depicted in block 412, the command prefix, the first parameter designation, and the second parameter designation are merged to form a console command for performing a specified task or operation. As depicted in block 414, the specified task or operation is performed by executing the console command, which may have its own parameters.

Having described the above illustrative embodiments, various alternative embodiments and/or variations may be made and/or practiced. For example, it was described herein that a desired entity designation (e.g., Volume) and a desired action designation (e.g., List) can be selected by a user on a UI display of a management computer, causing the selected entity and action designations to automatically appear on a command line of a CLI of the management computer. In an alternative embodiment, having entered the command prefix (e.g., xms) on the CLI using a keyboard, the user can strike the "space" bar, enter one or more characters of the desired entity designation (e.g., "V") on the CLI, and strike the "tab" key to complete the full entity name (e.g., Volume). Likewise, having completed the full entity name (e.g., Volume) on the CLI, the user can strike the "space" bar, enter one or more characters of the desired action designation (e.g., "L") on the CLI, and strike the "tab" key to complete the full action name (e.g., List). In this case, because the available action designations may include more than one action designation starting with the character "L" (e.g., "List," "List-Mappings"; see FIG. 2*b*), the user can strike the "tab" key once to complete the full action name "List" on the CLI or strike the "tab" key twice to complete the full action name "ListMappings" on the CLI. Other tab completion scenarios are possible. For example, having entered the command prefix (e.g., xms) on the CLI, the user can strike the "space" bar multiple times to cycle through the full names of the available entity designations on the CLI to obtain the desired entity designation (e.g., Volume), as well as strike the "space" bar multiple times to cycle through the full names of the available action designations on the CLI to obtain the desired action designation (e.g., List).

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a storage system used for block-based, file-based, or object storage. Storage arrays can include, for example, dedicated storage hardware containing HDDs, SSDs, and/or all-flash drives. A storage entity may be a filesystem, an object storage, a virtualized device, a logical unit (LU), a logical unit number (LUN), a logical volume (LV), a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit or device may be a physical entity such as a drive or disk or an array of drives or disks for storing data in storage locations that can be accessed by addresses. A physical storage unit or device may be used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "TO request" or "TO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A method of operating a management computer comprising a user interface (UI) and a command shell for facilitating the composition of simplified console commands, the method comprising:

orchestrating, by the management computer, creation of one or more storage entities of a storage system; and performing, by the management computer, a designated action relating to the one or more storage entities of the storage system, wherein performing the designated action relating to the one or more storage entities comprises:

receiving, at the UI of the management computer, a command prefix of a first simplified console command, the command prefix corresponding to an alias of a specified cmdlet of the command shell, the command prefix corresponding to a first hierarchical level of a command tree, the command tree including the first hierarchical level, a second hierarchical level, and a third hierarchical level;

executing, by the management computer, the alias of the specified cmdlet to access a plurality of entity parameter designations associated with the command prefix from the second hierarchical level of the command tree;

receiving, at the UI of the management computer, a user selection of an entity parameter designation from among the plurality of entity parameter designations, an entity designated by the entity parameter designation corresponding to a first command parameter of the first simplified console command;

in response to the user selection of the entity parameter designation, accessing, by the management computer, a plurality of action parameter designations associated with the entity from the third hierarchical level of the command tree;

receiving, at the UI of the management computer, a user selection of an action parameter designation from among the plurality of action parameter designations, the action parameter designation corresponding to the designated action relating to the one or more storage entities, the designated action corresponding to a second command parameter of the first simplified console command;

in response to the user selection of the action parameter designation, executing, by the management computer, a specified module of the command shell to merge the command prefix, the first command parameter, and the second command parameter, wherein executing the specified module comprises:

forming the first simplified console command in a manner that allows the first simplified console command to be recognized by the command shell without having to use a complex command name for performing the designated action; and executing, by the management computer using the command shell, the first simplified console command with one or more user parameters to perform the designated action, wherein performing the designated action includes at least one of adding the one or more storage entities to a collection, listing the one or more storage entities, modifying the one or more storage entities, and removing the one or more storage entities from the collection.

2. The method of claim 1 further comprising:

having received the command prefix at the UI of the management computer, entering the command prefix on a command line of a command line interface (CLI) of the management computer.

3. The method of claim 2 further comprising:

having received the user selection of the entity parameter designation from among the plurality of entity parameter designations, causing the entity parameter designation to automatically appear on the command line adjacent and following the command prefix, the command prefix and the entity parameter designation being separated on the command line by a first space character.

4. The method of claim 3 further comprising:

having received the user selection of the action parameter designation from among the plurality of action parameter designations, causing the action parameter designation to automatically appear on the command line adjacent and following the entity parameter designation, the entity parameter designation and the action parameter designation being separated on the command line by a second space character.

5. The method of claim 4 further comprising:

forming the first simplified console command on a next input line below the command line of the CLI.

6. The method of claim 4 further comprising:

forming the first simplified console command on the same input line as the command line of the CLI.

7. The method of claim 4 further comprising:

forming the first simplified console command on a next input line below the command line of the CLI or the same input line as the command line of the CLI with the first space character separating the command prefix and the entity parameter designation being removed and the second space character separating the entity parameter designation and the action parameter designation being removed.

8. The method of claim 1 wherein the command prefix corresponds to a second simplified console command configured to accept the entity parameter designation and the action parameter designation as a first command parameter and a second command parameter, respectively, and wherein the method further comprises:

executing, by the management computer using the command shell, the second simplified console command with the first command parameter to navigate the command tree to select the entity parameter designation; and executing, by the management computer using the command shell, the second simplified console command with the second command parameter to navigate the command tree to select the action parameter designation.

9. A system for facilitating the composition of simplified console commands, comprising:

a user interface (UI) including a command shell;

a memory; and processing circuitry configured to execute program instructions out of the memory to:

orchestrate creation of one or more storage entities of a storage system; and perform a designated action relating to the one or more storage entities of the storage system, wherein performing the designated action relating to the one or more storage entities comprises:

receiving, at the UI, a command prefix of a first simplified console command, the command prefix corresponding to an alias of a specified cmdlet of the command shell, the command prefix corresponding to a first hierarchical level of a command tree, the command tree including the first hierarchical level, a second hierarchical level, and a third hierarchical level;

executing the alias of the specified cmdlet to access a plurality of entity parameter designations associated with the command prefix from the second hierarchical level of the command tree;

receiving, at the UI, a user selection of an entity parameter designation from among the plurality of entity parameter designations, an entity designated by the entity parameter designation corresponding to a first command parameter of the first simplified console command;

in response to the user selection of the entity parameter designation, accessing a plurality of action parameter designations associated with the entity from the third hierarchical level of the command tree;

receiving, at the UI, a user selection of an action parameter designation from among the plurality of action parameter designations, the action parameter designation corresponding to the designated action relating to the one or more storage entities, the designated action corresponding to a second command parameter of the first simplified console command;

in response to the user selection of the action parameter designation, executing a specified module of the command shell to merge the command prefix, the first command parameter, and the second command parameter, wherein executing the specified module comprises:

forming the first simplified console command in a manner that allows the first simplified console command to be recognized by the command shell without having to use a complex command name for performing the designated action; and execute, using the command shell, the first simplified console command with one or more user parameters to perform the designated action, wherein performing the designated action includes at least one of adding the one or more storage entities to a collection, listing the one or more storage entities, modifying the one or more storage entities, and removing the one or more storage entities from the collection.

10. The system of claim 9 wherein the processing circuitry is further configured to execute the program instructions out of the memory, having received the command prefix at the UI, to enter the command prefix on a command line of a command line interface (CLI) of the management computer.

11. The system of claim 10 wherein the processing circuitry is further configured to execute the program instructions out of the memory, having received the user selection of the entity parameter designation from among the plurality of entity parameter designations, to cause the entity parameter designation to automatically appear on the command line adjacent and following the command prefix, wherein the command prefix and the entity parameter designation are separated on the command line by a first space character.

12. The system of claim 11 wherein the processing circuitry is further configured to execute the program instructions out of the memory, having received the user selection of the action parameter designation from among the plurality of action parameter designations, to cause the action parameter designation to automatically appear on the command line adjacent and following the entity parameter designation, wherein the entity parameter designation and the action parameter designation are separated on the command line by a second space character.

13. The system of claim 12 wherein the processing circuitry is further configured to execute the program instructions out of the memory to form the first simplified console command on a next input line below the command line of the CLI.

14. The system of claim 12 wherein the processing circuitry is further configured to execute the program instructions out of the memory to form the first simplified console command on the same input line as the command line of the CLI.

15. The system of claim 12 wherein the processing circuitry is further configured to execute the program instructions out of the memory to form the first simplified console command on a next input line below the command line of the CLI or the same input line as the command line of the CLI with the first space character separating the command prefix and the entity parameter designation being removed and the second space character separating the entity parameter designation and the action parameter designation being removed.

16. The system of claim 9 wherein the command prefix corresponds to a second simplified console command configured to accept the entity parameter designation and the action parameter designation as a first command parameter and a second command parameter, respectively, and wherein the processing circuitry is further configured to execute the program instructions out of the memory to execute, using the command shell, the second simplified console command with the first command parameter to navigate the command tree to select the entity parameter designation, and to execute, using the command shell, the second simplified console command with the second command parameter to navigate the command tree to select the action parameter designation.

17. A non-transitory computer-readable medium comprising instructions that, when executed by processing circuitry, cause the processing circuitry to perform operations comprising:

orchestrating, by the management computer, creation of one or more storage entities of a storage system; and performing, by the management computer, a designated action relating to the one or more storage entities of the storage system, wherein performing the designated action relating to the one or more storage entities comprises:

receiving, at a user interface (UI) of a management computer, a command prefix of a first simplified console command, the command prefix corresponding to an alias of a specified cmdlet of the command shell, the command prefix corresponding to a first hierarchical level of a command tree, the command tree including the first hierarchical level, a second hierarchical level, and a third hierarchical level;

executing, by the management computer, the alias of the specified cmdlet to access a plurality of entity parameter designations associated with the command prefix from the second hierarchical level of the command tree;

receiving, at the UI of the management computer, a user selection of an entity parameter designation from among the plurality of entity parameter designations, an entity designated by the entity parameter designation corresponding to a first command parameter of the first simplified console command;

in response to the user selection of the entity parameter designation, accessing, by the management computer, a plurality of action parameter designations associated with the entity from the third hierarchical level of the command tree;

receiving, at the UI of the management computer, a user selection of an action parameter designation from among the plurality of action parameter designations, the action parameter designation corresponding to the designated action relating to the one or more storage entities, the designated action corresponding to a second command parameter of the first simplified console command;

in response to the user selection of the action parameter designation, executing, by the management computer, a specified module of the command shell to merge the command prefix, the first command parameter, and the second command parameter, wherein executing the specified module comprises:

forming the first simplified console command in a manner that allows the first simplified console command to be recognized by the command shell without having to use a complex command name for performing the designated action; and executing, by the management computer using the command shell, the first simplified console command with one or more user parameters to perform the designated action, wherein performing the designated action includes at least one of adding the one or more storage entities to a collection, listing the one or more storage entities, modifying the one or more storage entities, and removing the one or more storage entities from the collection.

* * * * *